United States Patent
Bailey

(10) Patent No.: US 11,034,340 B2
(45) Date of Patent: *Jun. 15, 2021

(54) AUTOMATIC BRAKE BACKUP CONTROL SYSTEM AND METHOD

(71) Applicant: Westinghouse Air Brake Technologies Corporation, Wilmerding, PA (US)

(72) Inventor: Gary Lee Bailey, Frederick, MD (US)

(73) Assignee: WESTINGHOUSE AIR BRAKE TECHNOLOGIES CORPORATION, Wilmerding, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/436,014

(22) Filed: Jun. 10, 2019

(65) Prior Publication Data

US 2019/0291705 A1    Sep. 26, 2019

Related U.S. Application Data

(63) Continuation-in-part of application No. 15/463,264, filed on Mar. 20, 2017, now Pat. No. 10,315,637.

(51) Int. Cl.
*B60T 13/66* (2006.01)
*B60T 13/68* (2006.01)
*B61H 13/34* (2006.01)

(52) U.S. Cl.
CPC .......... *B60T 13/665* (2013.01); *B60T 13/683* (2013.01); *B60T 2270/402* (2013.01); *B61H 13/34* (2013.01)

(58) Field of Classification Search
CPC .... B60T 15/184; B60T 15/021; B60T 15/048; B60T 15/304; B60T 15/50; B60T 15/027; B60T 15/48; B60T 8/362; B60T 2270/402
See application file for complete search history.

(56) References Cited

U.S. PATENT DOCUMENTS

| | | | | |
|---|---|---|---|---|
| 5,415,465 A | * | 5/1995 | Skantar ................. | B60T 13/665 303/16 |
| 8,282,173 B2 | * | 10/2012 | Forster ...................... | B60T 7/20 303/15 |
| 8,944,525 B2 | * | 2/2015 | Mederer ............... | B60T 13/683 303/123 |

\* cited by examiner

*Primary Examiner* — Bradley T King
*Assistant Examiner* — Mahbubur Rashid
(74) *Attorney, Agent, or Firm* — Christopher R. Carroll; The Small Patent Law Group LLC

(57) ABSTRACT

A braking control system for a vehicle system includes a control chamber configured to control air pressure of a brake pipe of the vehicle system. The system also includes first and second charge valves and first and second vent valves. The first charge valve and the first vent valve are controllable to vent or charge the brake pipe, and the second charge valve and the second vent valve are separately controllable for the same purpose. The system also includes a controller configured to switch operation of the vehicle system between a first operation mode, where the first charge valve and the first vent valve are enabled, and a second operation mode, where the second charge valve and the second vent valve are enabled, in response to an input.

20 Claims, 3 Drawing Sheets

US 11,034,340 B2

AUTOMATIC BRAKE BACKUP CONTROL SYSTEM AND METHOD

CROSS-REFERENCE TO RELATED APPLICATIONS

This application is a continuation-in-part of U.S. patent application Ser. No. 15/463,264 filed 20 Mar. 2017, hereby incorporated by reference herein in its entirety.

FIELD

Embodiments relate to vehicle braking systems. Other embodiments relate to brake control systems for vehicles.

BACKGROUND

Some vehicles (e.g., locomotives and other rail vehicles) use pneumatic braking systems to control vehicle movement. For example, in the case of a vehicle system having plural rail vehicles formed into a train, brake application or release may be configured to respond to changes in brake pipe pressure, the brake pipe being a long continuous pipe that runs from the lead vehicle (e.g., lead locomotive) to the last vehicle. When the brakes of the train are to be applied, pneumatic control valves reduce the brake pipe pressure, and the individual brakes at each rail vehicle are applied in response. When the brakes of the train are to be released, pneumatic control valves increase brake pipe pressure, and the individual brakes at each rail vehicle are released in response. The pneumatic control valves for controlling the pressure of the brake pipe may be housed in a control unit, which may receive electronic control input from a vehicle controller, locomotive operator, etc. A more complete description of an electronic airbrake system and controls is provided in U.S. Pat. No. 6,017,098, which is incorporated herein by reference in its entirety.

If the electronically controlled valves operating the pneumatic valves fail, a train may still be brought to a stop through emergency brake application. Emergency vent valves are configured to rapidly reduce air pressure in the brake pipe to trigger application of the train's brakes. However, failure of the electronically controlled valves prevents normal operation of the train and may prevent the train from effectively continuing until it can be serviced and repaired. Furthermore, current failsafe systems do not allow a train operator to continue operating the locomotive/train under the default brake application and release functions. It may be desirable to have a vehicle braking system that differs from current systems.

BRIEF DESCRIPTION

In an embodiment, a braking control system for a vehicle system includes a control chamber configured to control air pressure of a brake pipe of the vehicle system. The system also includes a first electronically-controlled charge valve comprising an input configured to be connected to a source of control pressure and an output connected to the control chamber. The first charge valve is configured to, in a first state, permit air flow into the control chamber, and, in a second state, prevent air flow into the control chamber. The system also includes a first electronically-controlled vent valve comprising an input connected to the control chamber and an exhaust port connected to atmosphere. The first vent valve is configured to, in a first state, prevent air flow out of the control chamber, and, in a second state, permit air flow out of the control chamber and vent air to atmosphere. The system also includes a second electronically-controlled charge valve comprising an input connected to the source of control pressure and an output connected to the control chamber, and a second electronically-controlled vent valve comprising an input connected to the control chamber and an exhaust port open to atmosphere. The system also includes a controller configured to switch operation of the vehicle system between a first operation mode, wherein the first charge valve and the first vent valve are enabled, and a second operation mode, wherein the second charge valve and the second vent valve are enabled, in response to an input.

In an embodiment, a braking control system for a vehicle system (e.g., a train having at least one locomotive) equipped with an EAB (electronic air brake) system includes a brake pipe, a source of control pressure, and at least one brake. The system includes a pneumatic operating unit including a brake pipe control portion. The brake pipe control portion includes a primary passage network configured to interconnect the brake pipe to at least one pneumatic charging valve and at least one pneumatic venting valve. The brake pipe control portion also includes a control passage network configured to interconnect the source of control pressure to at least one electronically controlled valve; the source of control pressure is configured to cause operation of the at least one pneumatic charging valve and the at least one pneumatic venting valve. The brake pipe control portion further includes a control chamber (e.g., an equalizing reservoir control chamber) configured to control air pressure of the brake pipe. The brake pipe control portion further includes a first electronically controlled charge valve of the at least one electronically controlled valve including an input configured to be connected to the source of control pressure and an output connected to the control chamber. The first electronically controlled charge valve is configured to: in a first state, permit air flow into the control chamber; and, in a second state, prevent air flow into the control chamber. The brake pipe control portion further includes a first electronically controlled vent valve of the at least one electronically controlled valve including an input connected to the control chamber and an exhaust port connected to atmosphere. The first electronically controlled vent valve is configured to: in a first state, prevent air flow out of the control chamber; and, in a second state, permit air flow out of the control chamber and vent air to atmosphere. The brake pipe control portion further includes a second electronically controlled charge valve of the at least one electronically controlled valve including an input connected to the source of control pressure and an output connected to the control chamber. The brake pipe control portion further includes a second electronically controlled vent valve of the at least one electronically controlled valve including an input connected to the control chamber and an exhaust port open to atmosphere. The brake pipe control portion further includes an operating state control configured to switch operation of the vehicle system (e.g., the at least one locomotive) between a first (e.g., normal) operation mode, wherein the first electronically controlled charge valve and the first electronically controlled vent valve are enabled, and a second (e.g., backup) operation mode, wherein the second electronically controlled charge valve and the second electronically controlled vent valve are enabled, in response to an input (e.g., in input by an operator of the at least one locomotive, or a control signal received from a control system having one or more processors).

In an embodiment, the second electronically controlled charge valve may include an output connected to a shared passage that connects to a movable pneumatic valve that is connected to the control chamber. The second electronically controlled vent valve may include an input connected to the shared passage, and the first electronically controlled vent valve may include an exhaust port connected to the movable pneumatic valve and configured to vent to atmosphere through the movable pneumatic valve. Further, the at least one pneumatic charging valve and the at least one pneumatic venting valve may be at least partially housed in the brake pipe control portion. The control chamber may be connected to an auxiliary passage that is connected to an output of the movable pneumatic valve. The movable pneumatic valve may be configured to move between two positions, including: a first position and a second position. The first position may be representative of the normal operation mode, in which a connection between the first electronically controlled vent valve and the movable pneumatic valve is open, the shared passage is blocked at an input of the movable pneumatic valve, and the auxiliary passage is blocked at an output of the movable pneumatic valve. The second position may be representative of the backup operation mode, in which the connection between the first electronically controlled vent valve and the movable pneumatic valve is blocked and the shared passage is connected to the auxiliary passage from the input to the output of the movable pneumatic valve.

In an embodiment, the pneumatic operating unit may further include a brake cylinder control portion configured to control pressure in a brake cylinder of the at least one brake, a brake cylinder equalizing portion configured to control operation of a brake cylinder equalizing pipe, a power supply unit configured to provide power for operation of the at least one electronically controlled valve, and a control valve portion configured to provide pneumatic backup brake cylinder control in response to changes in brake pipe pressure. The system may further include at least one controller unit (e.g., positioned in or associated with a vehicle of the vehicle system, such as in a cab of the at least one locomotive), which includes an independent brake controller. The independent brake controller may be configured to generate control signals representative of the following states: a vent state, indicative of an increasing level of brake application; a lap state, indicative of a constant level of brake application; and a charge state, indicative of a decreasing level of brake application. The at least one locomotive may include a dual cab locomotive including a first cab with a first controller unit of the at least one controller unit and a second cab with a second controller unit of the at least one controller unit, and the power supply unit may include a backup control selector configured to switch control of the system between the first controller unit and the second controller unit. A first controller unit of the at least one controller unit and a second controller unit of the at least one controller unit may be positioned on or associated with a same console of the at least one locomotive, and the power supply unit may include a backup control selector configured to switch control of the system between the first controller unit and the second controller unit. Further, a vent state control signal may be configured to open the second electronically controlled vent valve and close the second electronically controlled charge valve, a lap state control signal may be configured to close the second electronically controlled vent valve and the second electronically controlled charge valve, and a charge state control signal may be configured to close the second electronically controlled vent valve and open the second electronically controlled charge valve.

In an embodiment, the second electronically controlled vent valve may be configured to, when in a first state, prevent the control chamber from venting to atmosphere, which prevents the brake pipe from venting to atmosphere. The second electronically controlled vent valve may be configured to, when in a second state, cause the control chamber to vent to atmosphere, which causes the brake pipe to vent to atmosphere, which triggers an increase in air pressure in a brake cylinder of the at least one brake. The second electronically controlled charge valve may be configured to, when in a first state, connect the source of control pressure to the control chamber, which causes the brake pipe to increase in air pressure, which triggers a decrease in air pressure in a brake cylinder of the at least one brake. The second electronically controlled charge valve may be configured to, when in a second state, block the source of control pressure from being connected to the control chamber.

In an embodiment, the operating state control, in the second (e.g., backup) operation mode, may be configured to: remove computer brake control of the brake pipe control portion; activate operation of an independent brake controller; enable operation of the second electronically controlled charge valve and the second electronically controlled vent valve; and communicate to at least one processor that the vehicle system is operating in the second operation mode. Further, the operating state control may include the movable pneumatic valve. The brake pipe control portion may further include a regulator reducing valve configured to be connected to the source of control pressure and reduce passthrough air pressure from an input to an output of the regulator reducing valve. An input of the regulator reducing valve may be connected to the source of control pressure, and an output of the regulator reducing valve may be connected to an input of the second electronically controlled charge valve.

In an embodiment, an automatic brake backup control method for a vehicle system (e.g., train) equipped with an EAB system includes at least one controller unit, a brake pipe, a source of control pressure, a brake pipe control portion including a control chamber (e.g., an equalizing reservoir control chamber) for controlling air pressure of the brake pipe, and at least one brake. The method includes receiving a control input (e.g., from an operator, or from a control system having at least one processor); the control input switches an operating state of the vehicle system from a first (e.g., normal) operation mode to a second (e.g., backup) operation mode. The method also includes removing computer brake control of the brake pipe control portion and activating operation of an independent brake controller of the at least one controller unit. The independent brake controller is configured to generate control signals representative of one of the following states: vent, lap, and charge. The method also includes disabling operation of a pneumatic exhaust connection of a first electronically controlled vent valve configured to vent air from the equalizing reservoir control chamber. The method further includes enabling operation of backup equalizing reservoir control valves. The backup valves include a second electronically controlled charge valve and a second electronically controlled vent valve. The method further includes communicating to at least one processor that the vehicle system is operating in the second (e.g., backup) operation mode.

In an embodiment, the method may include receiving a vent control signal from the independent brake controller.

The method may also include, in response to receiving the vent control signal, opening the second electronically controlled vent valve, causing the equalizing reservoir control chamber to vent to atmosphere, causing the brake pipe to vent to atmosphere, and triggering an increase in air pressure in a brake cylinder of the at least one brake. The method may further include, in response to receiving the vent control signal, closing the second electronically controlled charge valve, blocking the source of control pressure from being connected to the control chamber.

In an embodiment, the method may include receiving a lap control signal from the independent brake controller. The method may also include, in response to receiving the lap control signal, closing the second electronically controlled vent valve, preventing the equalizing reservoir control chamber from venting to atmosphere, preventing the brake pipe from venting to atmosphere. The method may further include, in response to receiving the lap control signal, closing the second electronically controlled charge valve, blocking the source of control pressure from being connected to the equalizing reservoir control chamber.

In an embodiment, the method may include receiving a charge control signal from the independent brake controller. The method may also include, in response to receiving the charge control signal, closing the second electronically controlled vent valve, preventing the equalizing reservoir control chamber from venting to atmosphere, and preventing the brake pipe from venting to atmosphere. The method may further include, in response to receiving the charge control signal, opening the second electronically controlled charge valve, connecting the source of control pressure to the equalizing reservoir control chamber, causing the brake pipe to increase in air pressure, and triggering a decrease in air pressure in a brake cylinder of the at least one brake.

In an embodiment, an automatic brake backup control system for a vehicle system (e.g., train) (e.g., equipped with an EAB system and including at least one locomotive, a brake pipe, a source of control pressure, and at least one brake) includes at least one handle controller unit positioned in or associated with a cab of the vehicle system. The at least one handle controller unit may include an independent brake controller including a handle and configured to generate control signals based at least partially on a position of the handle, the control signals being representative of one of the following states: vent, lap, and charge. The system may include a pneumatic operating unit positioned in or associated with a brake manifold of the vehicle system. The pneumatic operating unit may include a brake pipe control portion, a brake cylinder control portion, a brake cylinder equalizing portion, a power supply unit, and a control valve portion.

In an embodiment, the brake pipe control portion may include a primary passage network configured to interconnect the brake pipe to a charging cut-off valve and an emergency vent valve housed in the brake pipe control portion. The brake pipe control portion may include a control passage network configured to interconnect the source of control pressure to cut-in, cut-out, release, application, and emergency solenoid valves used to cause operation of the charging cut-off valve and the emergency vent valve. The brake pipe control portion may include an equalizing reservoir control chamber including a diaphragm connected to a pneumatic exhaust valve and a pneumatic supply valve. The pneumatic exhaust valve may be configured to decrease brake pipe pressure and the pneumatic supply valve may be configured to increase brake pipe pressure. The equalizing reservoir control chamber may be connected to an auxiliary passage that is connected to an output of a movable pneumatic valve.

In an embodiment, the brake pipe control portion may include a first charge solenoid valve including an input configured to be connected to the source of control pressure and an output connected to the equalizing reservoir control chamber. The first charge solenoid valve may be configured to: in an energized state, permit air flow into the equalizing reservoir control chamber; and, in a de-energized state, prevent air flow into the equalizing reservoir control chamber. The brake pipe control portion may include a first vent solenoid valve including an input connected to the equalizing reservoir control chamber and an exhaust port connected to the movable pneumatic valve. The first vent solenoid valve may be configured to: in an energized state, prevent air flow out of the equalizing reservoir control chamber; and, in a de-energized state, permit air flow out of the equalizing reservoir control chamber and vent air to atmosphere through the movable pneumatic valve. The brake pipe control portion may include a regulator reducing valve configured to be connected to the source of control pressure and configured to reduce pass-through air pressure from an input to an output of the regulator reducing valve.

In an embodiment, the brake pipe control portion may include a second charge solenoid valve including an input connected to the regulator reducing valve and an output connected through a choke to a shared passage that connects to the movable pneumatic valve. The second charge solenoid valve may be configured to, when energized, connect the source of control pressure to the equalizing reservoir control chamber, causing the brake pipe to increase in air pressure, which triggers a decrease in air pressure in a brake cylinder of the at least one brake. The second charge solenoid valve may be configured to, when de-energized, block the source of control pressure from being connected to the equalizing reservoir control chamber. The brake pipe control portion may include a second vent solenoid valve including an input connected to the shared passage and an exhaust port open to atmosphere. The second vent solenoid valve may be configured to, when energized, prevent the equalizing reservoir control chamber from venting to atmosphere, which prevents the brake pipe from venting to atmosphere. The second vent solenoid valve may be configured to, when de-energized, cause the equalizing reservoir control chamber to vent to atmosphere, causing the brake pipe to vent to atmosphere, which triggers an increase in air pressure in a brake cylinder of the at least one brake.

In an embodiment, the brake pipe control portion may include an operating state control that includes the movable pneumatic valve. The operating state control may be configured to switch operation of the vehicle system between a first (e.g., normal) operation mode and a second (e.g., backup) operation mode in response to an input (e.g., a mechanical input by an operator of the vehicle system, or an input signal from a control system, such as a vehicle control system, having one or more processors). The operating state control, in the second operation mode, may be configured to remove computer brake control of the brake pipe control portion; activate operation of the independent brake controller; enable operation of backup equalizing reservoir control valves, the backup valves including the second charge solenoid valve and the second vent solenoid valve; and communicate to at least one processor that the pneumatic operating unit is operating in the second operation mode. The movable pneumatic valve may be configured to move between two positions. The first position may be an upper or other position representative of the first operation mode, in which the pneumatic connection between the first vent solenoid valve and the movable pneumatic valve is open, the shared passage is blocked at an input of the movable pneumatic valve, and the auxiliary passage is blocked at an output of the movable pneumatic valve. The second position may be a lower or other position representative of the second operation mode, in which the pneumatic connection between the first vent solenoid valve and the movable pneumatic valve is blocked and the shared passage is connected to the auxiliary passage from the input to the output of the movable pneumatic valve.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

Reference is now made briefly to the accompanying drawings, in which.

DETAILED DESCRIPTION

Figure 1:
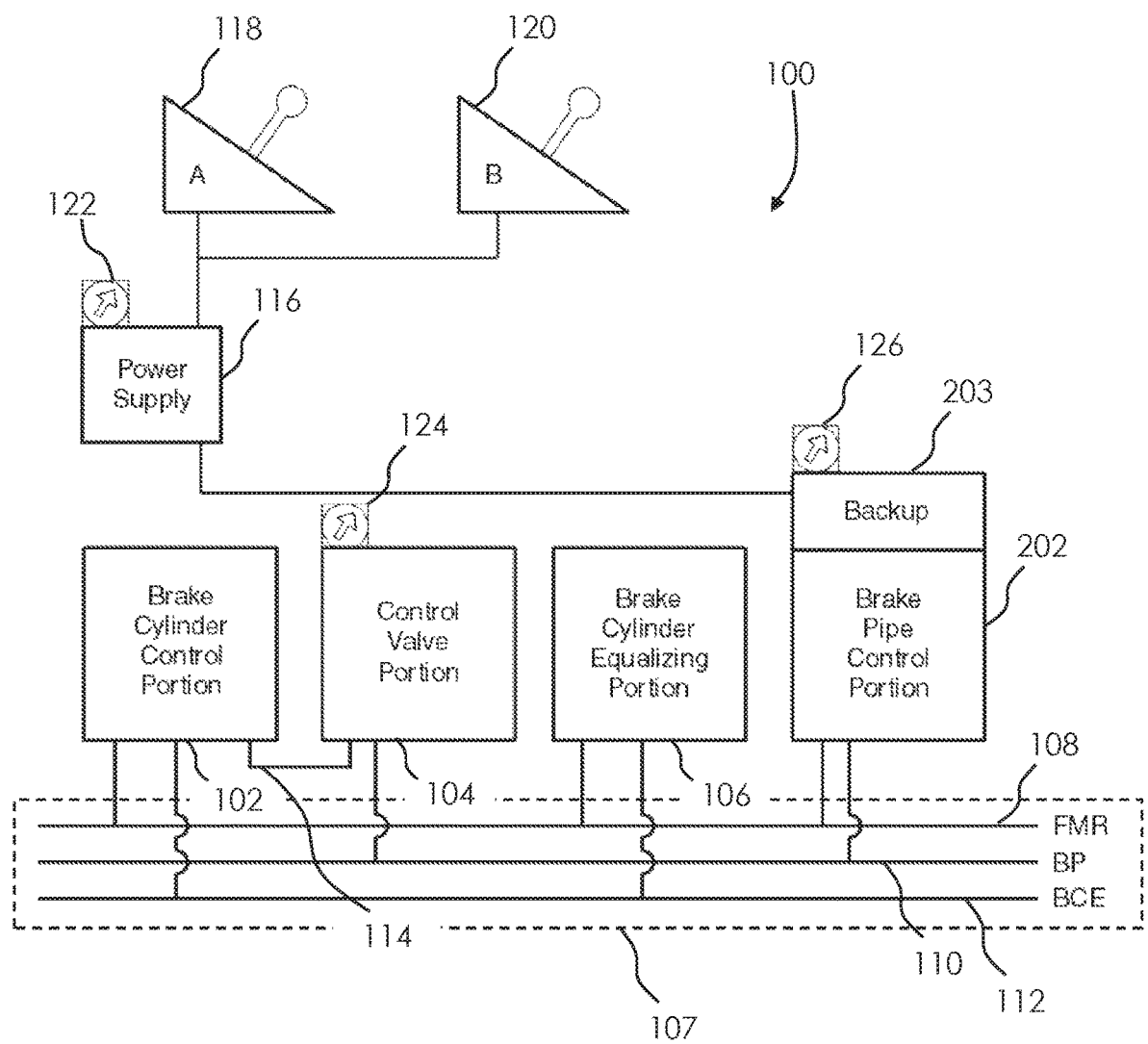
FIG. 1 is a schematic diagram of one embodiment or aspect of an automatic brake backup control system.

For purposes of the description hereinafter, the terms "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and process illustrated in the attached drawings, and described in the following specification, are simply exemplary embodiments of the invention. Hence, specific dimensions and other physical characteristics related to the embodiments disclosed herein are not to be considered as limiting.

As used herein, the terms "communication" and "communicate" refer to the receipt, transmission, or transfer of one or more signals, messages, commands, or other type of data. For one unit or device to be in communication with another unit or device means that the one unit or device is able to receive data from and/or transmit data to the other unit or device. A communication may use a direct or indirect connection, and may be wired and/or wireless in nature. Additionally, two units or devices may be in communication with each other even though the data transmitted may be modified, processed, routed, etc., between the first and second unit or device. For example, a first unit may be in communication with a second unit even though the first unit passively receives data, and does not actively transmit data to the second unit. As another example, a first unit may be in communication with a second unit if an intermediary unit processes data from one unit and transmits processed data to the second unit. It will be appreciated that numerous other arrangements are possible. Any known electronic communication protocols and/or algorithms may be used such as, for example, TCP/IP (including HTTP and other protocols), WLAN (including 802.11 and other radio frequency-based protocols and methods), analog transmissions, Global System for Mobile Communications (GSM), and/or the like.

As used herein in relation to pneumatic systems, valves, and assemblies, the term "connection" refers to a "pneumatic connection," and likewise for "connect" and other variants of the term. A pneumatic connection is an arrangement of elements such that air is able to fluidly flow from a first element to a second element. A connection between one element and another may be direct, such as a valve output being directly connected by its opening to a passageway or tube. A connection may also be indirect, such as a valve output being connected to the atmosphere by way of one or more passageways and/or valves. Additionally, two elements may be connected to each other even though the air flow may be changed in pressure, merged with another air flow, or split along different channels. It will be appreciated that numerous other arrangements are possible.

FIG. 1 shows a schematic diagram of an embodiment of a brake backup control system 100. The system 100 includes a pneumatic operating unit, which is made up of one or more pneumatic operating subunits, which are mechanical assemblies of pneumatic valves, pneumatic tubes, electronically controlled valves, and/or the like. The pneumatic operating subunits may include, but are not limited to, a brake pipe control portion 202, a brake cylinder control portion 102, a control valve portion 104 (e.g., a Wabtec MC-30 control valve portion), a brake cylinder equalizing portion 106, or any combination thereof. The pneumatic operating subunits are directly or indirectly connected by one or more pneumatic connections 107. The pneumatic connections 107 may be part of a pre-existing configuration of the train for which the system is installed. The pneumatic connections 107 may include, but are not limited to, a filtered main reservoir (FMR) 108, a brake pipe (BP) 110, a brake cylinder equalizing pipe (BCE) 112, or any combination thereof. The FMR 108 supplies filtered air from a main reservoir (MR) (not shown) and is configured to provide air pressure sufficient to operate pneumatic valves within at least the brake cylinder control portion 102, the brake cylinder equalizing portion 106, and the brake pipe control portion 202. Either the FMR 108 or the MR may serve as sources of control pressure for operating pneumatic valves within the system 100. The BP 110 supplies pressurized air that is required by the brake control system to charge various reservoirs and operate the brake control valves of each railcar in the train. The BP 110 is connected to at least the control valve portion 104 and the brake pipe control portion 202. The BCE 112 connects at least the brake cylinder control portion 102 and the brake cylinder equalizing portion 106. A control air line 114, also called a 16 pipe, may be used to connect the brake cylinder control portion 102 and the control valve portion 104. The control valve portion 104 is configured to provide backup control of the brake cylinder control portion 102 by altering control pressure in response to changes in BP 110 pressure, which in turn is controlled by the brake pipe control portion 202. It will be appreciated that other configurations are possible.

With further reference to FIG. 1, in another embodiment the system 100 alternatively or additionally includes backup equalizing reservoir controls 203 that are integral or adjacent to the brake pipe control portion 202. One embodiment of an arrangement of brake pipe control portion 202 and backup equalizing reservoir controls 203 is shown in detail in FIG. 2. Further, aspects of a brake pipe control portion are described in U.S. Pat. No. 6,017,098, which is incorporated herein by reference in its entirety. The backup equalizing reservoir controls 203 are configured to be cut in (enabled) to or cut out (disabled) from the brake pipe control portion 202, i.e., connected to or disconnected from the pneumatic passageways of the brake pipe control portion 202 such that the backup equalizing reservoir controls 203 may either take over or relinquish the charge, lap, and vent control of the BP 110. An operator of the locomotive can control whether the backup equalizing reservoir controls 203 are cut in or cut out by way of an operating state control 126, which may include a movable pneumatic valve, a limit switch, or other controller that may contain a movable pneumatic valve. For example, the operating state control 126 may be a movable pneumatic valve that is a mechanical control configured to move between two positions, such as an upper position and a lower position, which are representative of a normal operation mode and a backup operation mode, respectively. As the operator moves the movable pneumatic valve from the upper position to the lower position, the backup equalizing reservoir controls 203 would be cut in to the brake pipe control portion 202. Likewise, as the operator moves the movable pneumatic valve from the lower position to the upper position, the backup equalizing reservoir controls 203 would be cut out of the brake pipe control portion 202. It will be appreciated that other configurations or arrangements are possible.

With further reference to FIG. 1, in an embodiment, the system 100 includes a power supply 116 that houses a backup cab selector control 122. The power supply 116 may have backup wiring connected to the backup equalizing reservoir controls 203 and/or the brake pipe control portion 202. The backup cab selector control 122 may be mechanical or electronic, and it is configured to switch control of the backup equalizing reservoir controls 203 between a first "A" controller 118 and a second "B" controller 120, which each may independently control the operation of the backup brake control system. The electronic connection between the power supply 116 and the controllers 118, 120 may be direct or indirect. The A controller 118 and B controller 120 may be positioned on or associated with the same control console in a locomotive cab. Alternatively, the A controller 118 may be positioned on or associated with one cab of a dual cab locomotive, and the B controller 120 may be positioned or associated with another cab of a dual cab locomotive. Alternatively, the A controller 118 and B controller 120 may be positioned on or associated with separate locomotives. It will be appreciated that other configurations or arrangements are possible.

With further reference to FIG. 1, in an embodiment, the control valve portion may include or be associated with a train designation switch 124, which is configured to change the locomotive operation mode to represent the hauling of freight or passengers. For example, the train designation switch 124, when set to the "passenger" configuration, may allow the locomotive to apply the train's air brakes at a faster rate. Although most locomotives are designated to haul freight cargo, the train designation switch 124 can reconfigure operation of the air brakes to allow an otherwise freight-configured locomotive to effectively transport passengers. It will be appreciated that other configurations are possible.

Figure 2:
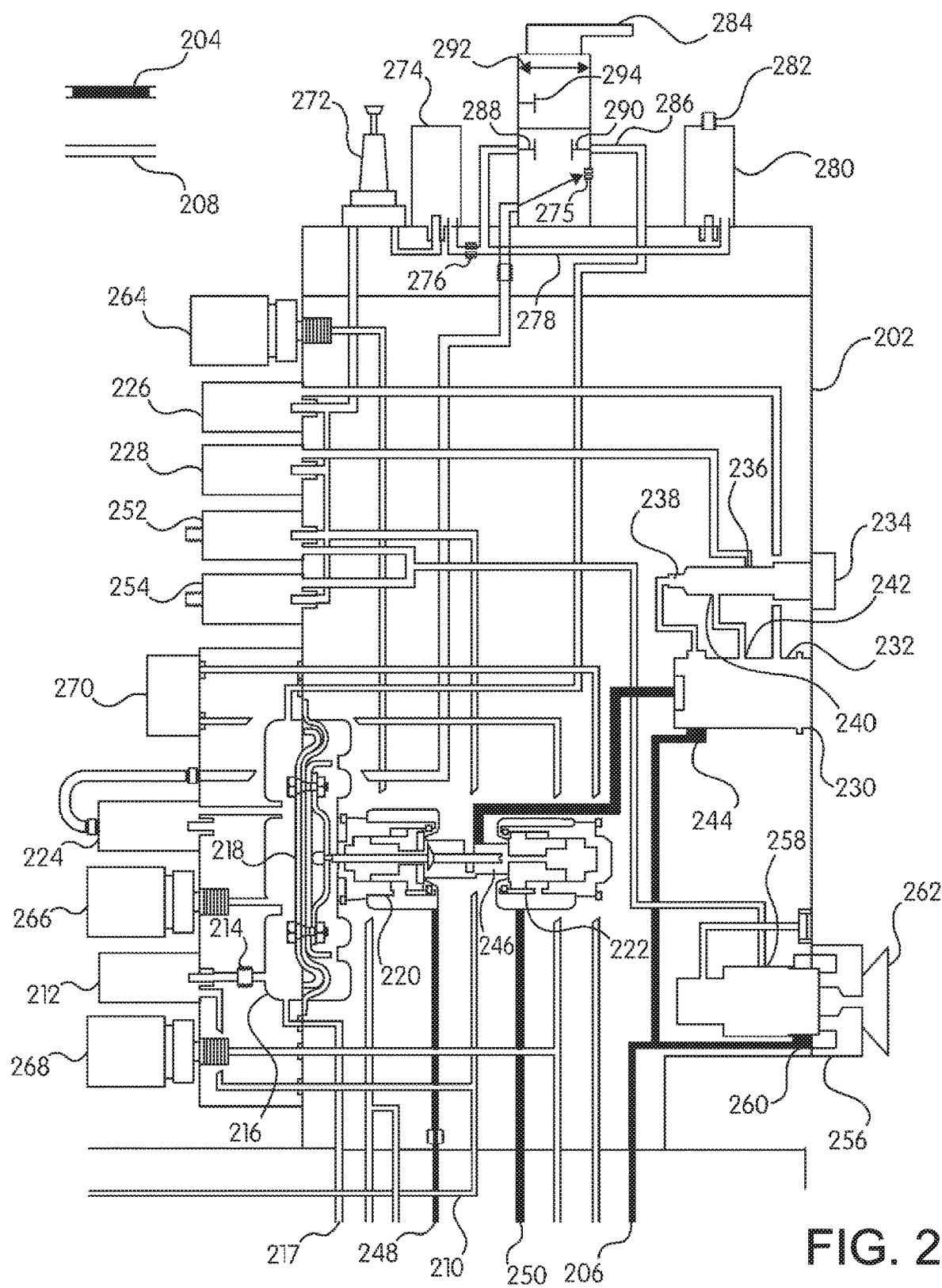
FIG. 2 is a schematic diagram of one embodiment or aspect of an automatic brake backup control system.

FIG. 2 shows a schematic diagram of an embodiment of an arrangement of elements within a brake pipe control portion 202. The specific arrangement is provided as an example of one possible configuration; other arrangements or configurations are possible. The brake pipe control portion 202 includes a primary passage network 204, which is designated by the darkened passageways, as shown in the key at the top left of the diagram. The primary passage network 204 is configured to interconnect the brake pipe (not shown) to valves and other components for increasing or decreasing the air pressure of the brake pipe. The brake pipe may be connected to the brake pipe control portion 202 by way of a brake pipe interface connection 206. The brake pipe control portion 202 also includes a control passage network 208 configured to interconnect a source of control pressure to one or more electronically controlled valves, the air pressure from the source of control pressure being used to cause operation of one or more pneumatically controlled valves, which are used to control the air pressure of at least the brake pipe. The control passage network 208 is designated by the undarkened passageways, as shown in the key at the top left of the diagram. An example source of control pressure is the FMR, which may be connected to the brake pipe control portion 202 by an FMR interface connection 210.

With further reference to FIG. 2, in an embodiment, the brake pipe control portion 202 includes a first electronically controlled charge valve ("1C valve") 212, such as a solenoid charge valve. The 1C valve 212 is configured to be connected to the source of control pressure at an input of the 1C valve 212 and is configured to be connected to an equalizing reservoir ("ER") control chamber 216 at an output of the 1C valve 212. The ER control chamber 216 is connected to an ER pipe via an ER interface connection 217. The connection of the 1C valve 212 to the ER control chamber 216 may include a one-way check valve 214 to prevent backflow from the ER control chamber 216 into the 1C valve 212. The 1C valve 212 is configured such that, in a first state or position, it permits air flow into the ER control chamber 216, and in a second state or position, it prevents air flow into the ER control chamber 216. The ER control chamber 216 includes a diaphragm 218 that is physically connected to a pneumatic exhaust valve 220 and a pneumatic supply valve 222 by a valve stem, the pneumatic valves 220, 222 being used to decrease or increase the air pressure of the brake pipe. As air pressure increases in the ER control chamber 216, the diaphragm 218 flexes outward against the valve stem. As the pressure exerted by the diaphragm 218 becomes greater than the brake pipe pressure exerted against the exhaust valve, the exhaust valve 220 seats, and further, the supply valve 222 unseats, allowing air flow into the brake pipe. The increase in brake pipe pressure will decrease service brake application. The ER control chamber 216 is further connected to a first electronically controlled vent valve ("1V valve") 224, such as a solenoid vent valve, at an input of the 1V valve 224. The 1V valve 224 has an exhaust port that may vent to atmosphere, and as depicted, the 1V valve 224 vents by way of an exhaust port 275 in a movable pneumatic valve 284. The 1V valve 224 is configured such that, in a first state or position, it prevents air flow out of the ER control chamber 216, and in a second state or position, it permits air flow out of the ER control chamber 216, which may vent to atmosphere in normal operation. As air pressure decreases in the ER control chamber 216, the diaphragm 218 contracts inward along the valve stem. As the pressure exerted by the diaphragm 218 becomes lesser than the brake pipe pressure exerted against the exhaust valve, the exhaust valve 220 unseats, and further, the supply valve 222 seats, allowing air flow out of the brake pipe. The decrease in brake pipe pressure will increase service brake application.

With further reference to FIG. 2, in an embodiment, the brake pipe control portion 202 includes a cut-out valve 226 and a cut-in valve 228, which may be electronically controlled, such as solenoid valves. The cut-out valve 226 and the cut-in valve 228 are connected to the source of control pressure by way of a control passageway connected to the FMR interface connection 210. The cut-out valve 226 and the cut-in valve 228 are used to change operation of the locomotive between a LEAD CUT-IN mode and a LEAD CUT-OUT mode, as selected by the locomotive operator. The LEAD CUT-IN mode allows the operator to adjust brake pipe pressure via the ER control chamber, which may be controlled by the 1C valve and the 1V valve. The LEAD CUT-OUT mode prevents the ER control chamber from affecting the brake pipe pressure. The cut-out valve 226 is connected to a charging cut-off valve 230 at a closing chamber 232 of the charging cut-off valve 230. The cut-in valve 228 is connected to a double check valve 234 at a first inlet 236 of the double check valve 234. The double check valve 234 also includes a second inlet 238 connected to the vent chamber 244 of the charging cut-off valve 230, and an outlet 240 connected to the opening chamber 242 of the charging cut-off valve 230. The vent chamber 244 of the charging cut-off valve 230 is connected to the brake pipe via a primary passageway connected to the brake pipe interface connection 206.

With further reference to FIG. 2, in an embodiment, in a LEAD CUT-IN mode, a signal from the operator triggers the cut-in valve 228 to be opened and the cut-out valve 226 to be closed. This permits air flow from the source of control pressure to enter the first inlet 236 of the double check valve 234. Air flow from the brake pipe passes through the charging cut-off valve 230 into the second inlet 238 of the double check valve 234, and the higher of the pressures between the first inlet 236 and the second inlet 238 proceeds to cause air flow into the opening chamber 242 of the charging cut-off valve 230. The closing chamber 232 of the charging cut-off valve 230 is vented to atmosphere in the LEAD CUT-IN mode. With the pressure being higher in the opening chamber 242 than the closing chamber 232, the vent chamber 244 is connected to an intermediate chamber 246 between the exhaust valve 220 and the supply valve 222. If the exhaust valve 220 is unseated, which is caused by a comparatively higher brake pipe pressure, the intermediate chamber 246 may vent to atmosphere through an exhaust port 248. If the exhaust valve 220 is seated and the supply valve 222 is unseated, air pressure from a source of control pressure may flow back into the brake pipe. This source of control pressure may enter through an opening in the brake pipe control portion 202, such as a main reservoir interface connection 250. Therefore, in LEAD CUT-IN mode, the air pressure of the brake pipe can be manipulated by operation of the exhaust valve 220 and supply valve 222, which in turn are controlled by the ER control chamber 216, the 1C valve 212, and the 1V valve 224. Ultimately, an automatic brake controller (not shown) would be able to adjust the pressure of the brake pipe by activating or deactivating the 1C valve 212 and the 1V valve 224, in addition to any emergency venting components.

With further reference to FIG. 2, in an embodiment, in a LEAD CUT-OUT mode, a signal from the operator triggers the cut-in valve 228 to be closed and the cut-out valve 226 to be opened. This permits air flow from the cut-out valve 226 into the closing chamber 232 of the charging cut-off valve 230, which would overcome the counter-pressure in the opening chamber 242. The venting chamber 244 thereby becomes cut off from the intermediate chamber 246. Therefore, in LEAD CUT-IN mode, the air pressure of the brake pipe cannot be manipulated by operation of the exhaust valve 220 and supply valve 222. Ultimately, an automatic brake controller (not shown) would not be able to adjust the pressure of the brake pipe by activating or deactivating the 1C valve 212 and the 1V valve 224, but it would still be able to control any emergency venting components.

With further reference to FIG. 2, in an embodiment, the brake pipe control portion 202 may include one or more emergency control valves, such as a first electronically controlled emergency valve ("1E valve") 252 and a second electronically controlled emergency valve ("2E valve") 254, shown in the schematic diagram. Preferred electronically controlled valves are solenoid valves, but other embodiments are possible. The emergency control valves 252, 254 are connected at an input to a source of control pressure, such as from the FMR interface connection 210. The emergency control valves 252, 254 are connected at an output to an emergency vent valve 256 at an opening chamber 258 of the emergency vent valve 256. The emergency vent valve 256 is also connected to the brake pipe at a vent chamber 260. When one or more of the emergency control valves 252, 254 receive an emergency brake application signal, such as from an automatic brake controller, an independent brake controller, or a mechanical input, one or both of the emergency control valves 252, 254 are opened. When opened, the emergency control valves 252, 254 permit air flow from the source of control pressure into the opening chamber 258 of the emergency vent valve 256. This opens the emergency vent valve 256 and allows the brake pipe to vent to atmosphere through an emergency exhaust port 262, thereby triggering an emergency application of the train's brakes.

With further reference to FIG. 2, in an embodiment, the brake pipe control portion 202 may include one or more transducers for determining the air pressure of its various pneumatic connections. These transducers may include, but are not limited to, a brake pipe transducer 264 for determining the pressure of the brake pipe, an equalizing reservoir transducer 266 for determining the pressure of the ER control chamber 216, and a main reservoir transducer 268 for determining the pressure of the MR. The brake pipe control portion 202 may also include a differential transducer 270 for determining the pressure differential between a main reservoir high port and a main reservoir low port in a locomotive with distributed power capability. In a locomotive without distributed power capability, the differential transducer 270 may be replaced by a gage transducer to determine the main reservoir low port pressure, with the main reservoir high port reading being blanked.

With further reference to FIG. 2, in an embodiment, the brake pipe control portion 202 includes a set of elements shown in FIG. 1 identified as backup equalizing reservoir controls 203, along with their supporting components. As shown in FIG. 2, these components are primarily a regulator reducing valve 272, backup ER control valves 274, 280, and a movable pneumatic valve 284, but it will be appreciated that other configurations and arrangements are possible. Depicted is a regulator reducing valve 272, which is connected to the source of control pressure, such as by way of the FMR interface connection 210. The regulator reducing valve 272 is configured to reduce pass-through air pressure from its input to its output, so that an unacceptably high air pressure from a source of control pressure does not over-pressurize the backup equalizing reservoir controls. The regulator reducing valve 272 is connected at its output to the input of a second electronically controlled charge valve ("2C valve") 274, such as a solenoid charge valve. The 2C valve 274 is configured to be blocked off in normal operation and connected to the ER control chamber 216 in backup operation mode. One example connection configuration is depicted, wherein an output of the 2C valve 274 is connected to a shared control passageway 278, by way of a choke 276. The shared passage 278 is connected to an input of the movable pneumatic valve 284 and to an input of a second electronically controlled vent valve ("2V valve") 280, such as a solenoid vent valve. The 2V valve 280 has an exhaust port 282 configured to vent air pressure to atmosphere when connected to the ER control chamber 216. At an output of the movable pneumatic valve 284 is an auxiliary control passageway 286 that connects the movable pneumatic valve 284 to the ER control chamber 216.

With further reference to FIG. 2, in an embodiment, the movable pneumatic valve 284 also includes a first barrier 288 at the input of the movable pneumatic valve 284 and a second barrier 290 at the output of the movable pneumatic valve 284, which are positioned to prevent air flow from the shared passage 278 to the auxiliary passage 286 during normal operation of the brake pipe control portion 202. The movable pneumatic valve 284 also includes an intermediate control passageway 292 that, when the movable pneumatic valve 284 is lowered from a first position to a second position representing backup operation mode, connects the shared passage 278 to the auxiliary passage 286. In backup operation mode, the barriers 288, 290 are removed from the input and output of the movable pneumatic valve 284, allowing the intermediate passage 292 to connect the input and output. Further, the movable pneumatic valve includes a third barrier 294 that is not employed in normal operation mode, but when the movable pneumatic valve 284 is moved to the second position representative of the backup operation mode, the third barrier 294 closes off the 1V valve 224 from venting to atmosphere through the exhaust port 275 of the movable pneumatic valve 284. It will be appreciated that there are various other arrangements and configurations for cutting out (i.e., disabling operation of) the primary control valves, 1C valve 212 and 1V valve 224, and cutting in (i.e., enabling operation of) the backup control valves, 2C valve 274 and 2V valve 280. In the backup operation mode, both the 2C valve 274 and the 2V valve 280 are connected to the ER control chamber 216 such that they can pressurize and depressurize, respectively, the ER control chamber 216. In this manner, should there be a problem or failure with the primary control valves, the 2C valve 274 can replace the function of the 1C valve 212, and the 2V valve 280 can replace the function of the 1V valve 224.

Figure 3:
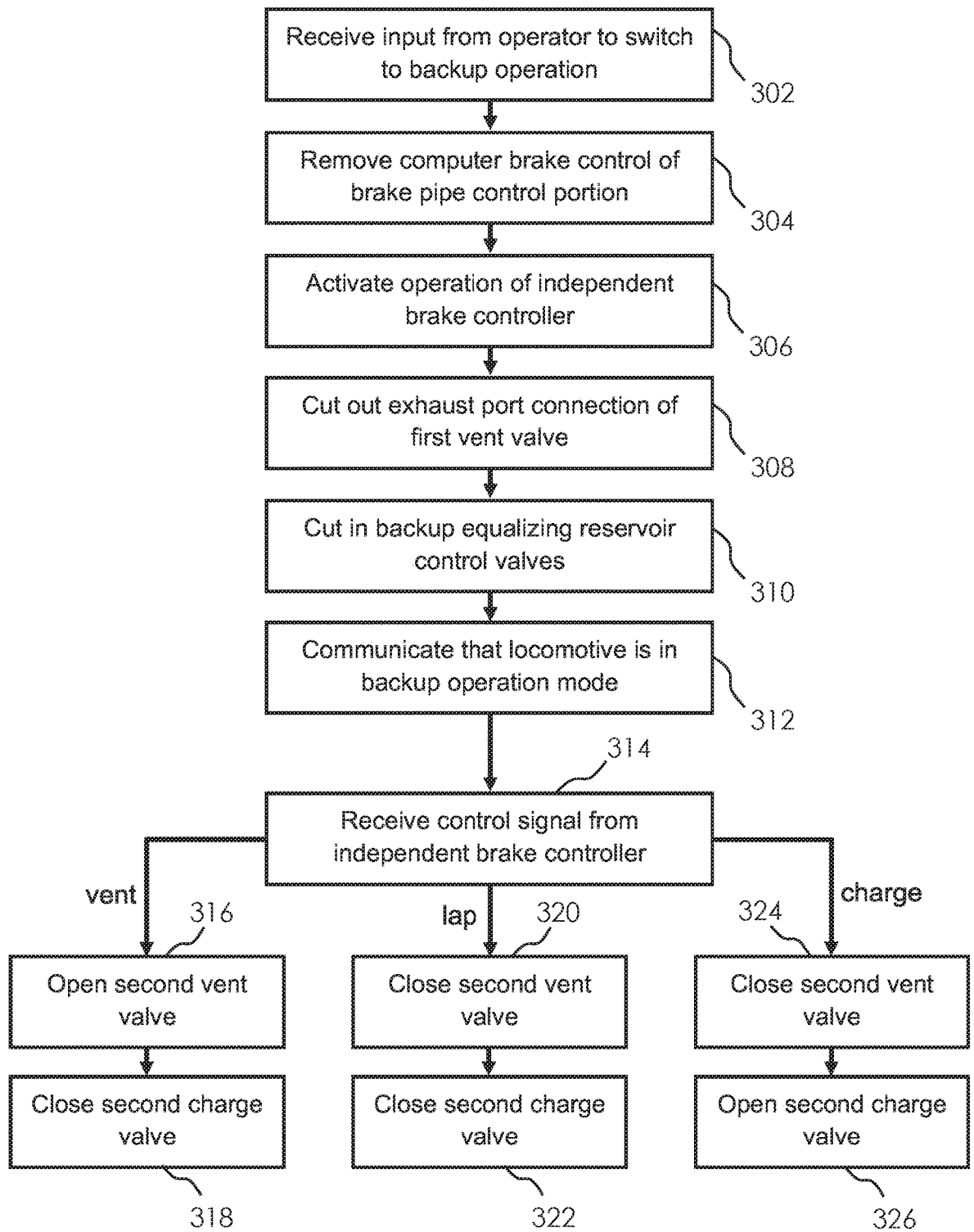
FIG. 3 is a step diagram of an automatic brake backup control method.

With specific reference to FIG. 3, provided is a step diagram of an automatic brake backup control method, according to the principles of the present invention. At step 302, the system receives input from the locomotive operator to switch the system from normal operation mode into backup operation mode. At step 304, the system removes computerized brake control of the brake pipe control portion and, at step 306, activates operation of an independent brake controller to control backup equalizing reservoir controls. The independent controller may be one of a number of viable controllers positioned on or associated with the train, and it may be selected by a backup cab selector control. At step 308, the system cuts out the exhaust port connection of the 1V valve, preventing it from venting air from the ER control chamber to atmosphere. At step 310, the system cuts in backup equalizing reservoir control valves, namely, the 2C valve and the 2V valve, which are connected to the ER control chamber to control its pressure. At step 312, the system communicates that the locomotive is in backup operation mode. Once in backup operation mode, the system may act in response to control signals received from the independent controller, at step 314, the control signals including vent, lap, and/or charge control signals.

With further reference to FIG. 3, according to one aspect, if the system receives a vent control signal, it will open the 2V valve, at step 316, allowing the ER control chamber to vent to atmosphere. Also, at step 318, it will close the 2C valve, preventing the source of control pressure from increasing pressure in the ER control chamber. Through steps 316 and 318, the pressure in the ER control chamber will drop, unseating the exhaust valve, and causing the brake pipe to exhaust to atmosphere and drop in pressure. The drop in pressure in the brake pipe will increase service application of the train's brakes. If the system receives a lap control signal, it will close the 2V valve, at step 320, preventing the ER control chamber from venting to atmosphere. Also, at step 322, it will close the 2C valve, preventing the source of control pressure from increasing pressure in the ER control chamber. Through steps 320 and 322, the pressure in the ER control chamber will remain static, allowing the brake pipe pressure to equalize against the exhaust valve, preventing either air exhaust or supply to the brake pipe. The brake pipe consequently remains static in pressure, allowing the train's brakes to assume a lap state. If the system receives a charge control signal, it will close the 2V valve, at step 324, preventing the ER control chamber from venting to atmosphere. Also, at step 326, it will open the 2C valve, allowing the source of control pressure to increase pressure in the ER control chamber. Through steps 324 and 326, the pressure in the ER control chamber will increase, seating the exhaust valve, unseating the supply valve, and causing the brake pipe to increase in pressure. The increase in pressure in the brake pipe will decrease service application of the train's brakes. It will be appreciated that any step of the method requiring a valve to "close" or "open" should be interpreted to encompass "remain closed" and "remain open," in circumstances where a valve is already closed or open. It will be appreciated that other configurations or arrangements are possible.

This written description uses examples to disclose several embodiments of the inventive subject matter and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A braking control system for a vehicle system, comprising:
    a control chamber configured to control air pressure of a brake pipe of the vehicle system;
    a first electronically-controlled charge valve comprising a first input configured to be connected to a source of control pressure and a first output connected to the control chamber, the first electronically-controlled charge valve configured to, in a first state, permit air flow into the control chamber, and, in a second state, prevent air flow into the control chamber;
    a first electronically-controlled vent valve comprising a second input connected to the control chamber and a first exhaust port connected to atmosphere, the first electronically-controlled vent valve configured to, in a first state, prevent air flow out of the control chamber, and, in a second state, permit air flow out of the control chamber and vent air to atmosphere;
    a second electronically-controlled charge valve comprising a third input connected to the source of control pressure and a second output connected to the control chamber;
    a second electronically-controlled vent valve comprising a fourth input connected to the control chamber and a second exhaust port open to atmosphere; and
    a controller configured to switch operation of the vehicle system between a first operation mode, wherein the first electronically-controlled charge valve and the first electronically-controlled vent valve are enabled, and a second operation mode, wherein the second electronically-controlled charge valve and the second electronically-controlled vent valve are enabled, in response to at least one of an input by an operator of the vehicle system or a control signal received from a control system having one or more processors.

2. The system of claim 1, wherein the controller comprises a pneumatic valve,
    wherein the second electronically-controlled charge valve comprises a third output connected to a shared passage that connects to the pneumatic valve that is connected to the control chamber,
    wherein the second electronically-controlled vent valve comprises a fifth input connected to the shared passage; and
    wherein the first electronically-controlled vent valve comprises the first exhaust port that is connected to the pneumatic valve and configured to vent to atmosphere through the pneumatic valve.

3. The system of claim 2, wherein the control chamber is connected to an auxiliary passage that is connected to an output of the pneumatic valve, the pneumatic valve being configured to move between two positions, the positions comprising:
    a first position representative of the first operation mode, in which a connection between the first electronically-controlled vent valve and the pneumatic valve is open, the shared passage is blocked at an input of the pneumatic valve, and the auxiliary passage is blocked at the output of the pneumatic valve; and
    a second position representative of the second operation mode, in which the connection between the first electronically-controlled vent valve and the pneumatic valve is blocked and the shared passage is connected to the auxiliary passage from the input to the output of the pneumatic valve.

4. The system of claim 1, further comprising:
    a first brake controller and a second brake controller on board the vehicle system, wherein the first brake controller is configured to generate control signals to control the first electronically-controlled charge valve and the first electronically-controlled vent valve, and the second brake controller is configured to generate control signals to control the second electronically-controlled charge valve and the second electronically-controlled vent valve, the control signals of the first brake controller and the second brake controller both representative of states including:
    a vent state, indicative of an increasing level of brake application;
    a lap state, indicative of a constant level of brake application; and
    a charge state, indicative of a decreasing level of brake application.

5. The system of claim 4, wherein the first brake controller and the second brake controller are onboard the vehicle system, wherein the system further comprises a power supply unit configured to provide power for operation of the first electronically-controlled charge valve and the second electronically-controlled charge valve and the first electronically-controlled vent valve and the second electronically-controlled vent valve, and wherein the power supply unit comprises a backup control selector configured to switch control of the system between the first brake controller and the second brake controller.

6. The system of claim 5, wherein the first brake controller and the second brake controller are positioned on or associated with a console of the vehicle system.

7. The system of claim 4, wherein the control signals of the first brake controller and the second brake controller comprise a vent state control signal configured to open the second electronically-controlled vent valve and close the second electronically-controlled charge valve, a lap state control signal configured to close the second electronically-controlled vent valve and the second electronically-controlled charge valve, and a charge state control signal configured to close the second electronically-controlled vent valve and open the second electronically-controlled charge valve.

8. The system of claim 7, wherein the second electronically-controlled vent valve is configured to: when in a first state, prevent the control chamber from venting to atmosphere, which prevents the brake pipe from venting to atmosphere; and when in a second state, cause the control chamber to vent to atmosphere, causing the brake pipe to vent to atmosphere, which triggers an increase in air pressure in a brake cylinder of at least one brake operably coupled to the brake pipe.

9. The system of claim 7, wherein the second electronically-controlled charge valve is configured to: when in a first state, connect the source of control pressure to the control chamber, causing the brake pipe to increase in air pressure, which triggers a decrease in air pressure in a brake cylinder of at least one brake operably coupled to the brake pipe; and when in a second state, block the source of control pressure from being connected to the control chamber.

10. The system of claim 2, wherein the controller, in the second operation mode, is configured to:
remove a computer brake control of a brake pipe control portion, wherein removing the computer brake control of a brake pipe control portion includes restricting the operation of a computer providing the computer brake control of a brake pipe control portion;
activate operation of an independent brake controller;
enable operation of the second charge valve and the second electronically-controlled vent valve; and communicate to at least one processor that the vehicle system is operating in the second operation mode.

11. A braking control system for a vehicle system, comprising:
first and second charge valves;
first and second vent valves;
a source of control pressure configured to selectively operate at least the first and second charge valves and the first and second vent valves, wherein the first charge valve is configured to:
in a first state, permit fluid flow into an equalizing reservoir control chamber; and,
in a second state, prevent fluid flow into the equalizing reservoir control chamber,
wherein the first vent valve is configured to:
in a first state, prevent fluid flow out of the equalizing reservoir control chamber; and,
in a second state, permit fluid flow out of the equalizing reservoir control chamber and vent fluid to atmosphere,
wherein the second charge valve is connected to the source of control pressure and an output connected to the equalizing reservoir control chamber, wherein the second vent valve is coupled to the equalizing reservoir control chamber and a third exhaust port open to atmosphere; and
an operating state controller configured to switch operation of the vehicle system in response to an input to a first operation mode in which the first charge valve and the first vent valve are enabled, and a second operation mode in which the second charge valve and the second vent valve are enabled; and from the first operation mode in which the first charge valve and the first vent valve are enabled, and the second operation mode in which the second charge valve and the second vent valve are enabled.

12. A braking control method for a vehicle system, comprising:
receiving a control input, the control input switching an operating state of the vehicle system from a first operation mode to a second operation mode;
responsive to switching to the second operation mode, removing computer brake control of a brake pipe control portion of the vehicle system, wherein removing the computer brake control of the brake pipe control portion includes restricting the operation of a computer providing the computer brake control of the brake pipe control portion;
activating operation of an independent brake controller, the independent brake controller configured to generate plural control signals respectively representative of states that include:
a vent state, indicative of an increasing level of brake application;
a lap state, indicative of a constant level of brake application; and
a charge state, indicative of a decreasing level of brake application;
disabling operation of a pneumatic exhaust connection of a first electronically controlled vent valve configured to vent air from an equalizing reservoir control chamber of a brake pipe of the vehicle system;
enabling operation of backup equalizing reservoir control valves, the backup valves comprising an electronically controlled charge valve and a second electronically controlled vent valve; and
communicating to at least one processor that the vehicle system is operating in the second operation mode.

13. The braking control method of claim 12, further comprising receiving a vent control signal from the independent brake controller.

14. The braking control method of claim 13, further comprising, in response to receiving the vent control signal, opening the second electronically controlled vent valve, causing the equalizing reservoir control chamber to vent to atmosphere, causing the brake pipe to vent to atmosphere, and triggering an increase in air pressure in a brake cylinder of at least one brake of the vehicle system.

15. The braking control method of claim 13, further comprising, in response to receiving the vent control signal, closing a second electronically controlled charge valve, blocking a source of control pressure from being connected to the equalizing reservoir control chamber.

16. The braking control method of claim 12, further comprising receiving a lap control signal from the independent brake controller.

17. The braking control method of claim 16, further comprising, in response to receiving the lap control signal, closing the second electronically controlled vent valve, preventing the equalizing reservoir control chamber from venting to atmosphere, and preventing the brake pipe of the vehicle system from venting to atmosphere.

18. The braking control method of claim 16, further comprising, in response to receiving the lap control signal, closing a second electronically controlled charge valve, blocking a source of control pressure from being connected to the equalizing reservoir control chamber.

19. The braking control method of claim 12, further comprising receiving a charge control signal from the independent brake controller.

20. The braking control method of claim 19, further comprising, in response to receiving the charge control signal, closing the second electronically controlled vent valve, preventing the equalizing reservoir control chamber from venting to atmosphere, and preventing the brake pipe of the vehicle system from venting to atmosphere.

\* \* \* \* \*